May 12, 1964 G. F. LAMBETH 3,133,017
METHOD AND APPARATUS FOR ACTIVATED SLUDGE TREATMENT
Filed Sept. 24, 1959 6 Sheets-Sheet 1

INVENTOR
George F. Lambeth
BY Theodore M. Jablon
ATTORNEY

May 12, 1964   G. F. LAMBETH   3,133,017
METHOD AND APPARATUS FOR ACTIVATED SLUDGE TREATMENT
Filed Sept. 24, 1959   6 Sheets—Sheet 2

INVENTOR
George F. Lambeth
BY Theodore M. Jablon
ATTORNEY

May 12, 1964  G. F. LAMBETH  3,133,017
METHOD AND APPARATUS FOR ACTIVATED SLUDGE TREATMENT
Filed Sept. 24, 1959  6 Sheets-Sheet 3

INVENTOR
George F. Lambeth
BY Theodore M. Jablon
ATTORNEY

May 12, 1964     G. F. LAMBETH     3,133,017
METHOD AND APPARATUS FOR ACTIVATED SLUDGE TREATMENT
Filed Sept. 24, 1959                 6 Sheets-Sheet 4

INVENTOR.
George F. Lambeth
BY Theodore M. Jablon
ATTORNEY

May 12, 1964    G. F. LAMBETH    3,133,017
METHOD AND APPARATUS FOR ACTIVATED SLUDGE TREATMENT
Filed Sept. 24, 1959    6 Sheets-Sheet 5

INVENTOR.
George F. Lambeth
BY Theodore M. Jablon
ATTORNEY

May 12, 1964     G. F. LAMBETH     3,133,017
METHOD AND APPARATUS FOR ACTIVATED SLUDGE TREATMENT
Filed Sept. 24, 1959     6 Sheets-Sheet 6

INVENTOR.
George F. Lambeth
BY *Theodore M. Jablon*
ATTORNEY

United States Patent Office 3,133,017
Patented May 12, 1964

3,133,017
METHOD AND APPARATUS FOR ACTIVATED SLUDGE TREATMENT
George F. Lambeth, Springdale, Conn., assignor to Dorr-Oliver Incorporated, Stamford, Conn., a corporation of Delaware
Filed Sept. 24, 1959, Ser. No. 842,107
23 Claims. (Cl. 210—5)

This invention relates to the purification treatment of wastes having contaminating putrescible solids and liquids.

More particularly this relates to improvements in the kind of aerobic treatment known as the activated sludge process wherein sewage liquid which may be primary clarifier overflow passing through a treatment tank is subjected to oxygenation as by aeration through suitable submerged gas diffusion means. Purification of the sewage liquid is effected by the aerobic organisms of biologically active flocs in the presence of dissolved oxygen, through an absorption reaction between the sewage matter and these flocs. Generally speaking as the flocs develop progressively they become biologically more effective as to their adsorption capability, and also more effective as to oxygen utilization by these organisms, and thus more effective in achieving purification with respect to the sewage matter on which to feed.

For maintaining this treatment process on a continuous basis, it is therefore general practice to return to the sewage liquid undergoing aeration treatment, separated activated sludge at a suitable rate, which sludge results as underflow from a sedimentation operation to which the treated or purified effluent of the aeration tank is usually subjected. It is generally desirable that this aerobic return sludge be supplied to the aeration tank as promptly and as fresh as possible in order that an aerobically healthy condition be maintained in the aeration tank the contents of which are kept in a state of agitation and mixture by reason of the air-lifting effect of the gas diffusor means, without the need of any submerged mechanism.

This invention is concerned with the kind of aeration treatment operation that relies solely upon such air-introduction for establishing contact, and encouraging the absorption reaction between the sewage matter and the biologically active flocs. It is among the objects to improve this treatment operation with respect to aeration tank volume requirements, as well as in regard to improving the biological performance relative to oxygen utilization as well as to the aeration power requirements. Thus, it is an object of the invention to achieve improved biological purification effects in a minimum of aeration tank volume with a minimum of air requirements, and at the same time to produce a maximum of well-developed flocs of improved settling characteristics, and thus a readily settleable activated sludge. Another object is to attain maximum floc density in the tank.

Another object is to effect the return transportation of fresh and well-developed flocs immediately after their formation and without undergoing sedimentation, towards the influent end of the tank, and without the need of pumps or the like.

As part of the concept underlying this invention for greater all round efficiency, it is desirable to maintain the oxygen demand distributed as uniformly as possible throughout the body of liquid undergoing aeration from end to end of the tank. In this connection it should be understood that the dissolved oxygen residual at any time and at any point of the liquid body undergoing aeration treatment is the result of the oxygen demand which in turn depends upon the amount of food present for the aerobic organisms, so that the shape of a curve showing the dissolved oxygen level along the path of the net horizontal progress of the sewage liquid through the tank, becomes the indicator of the biological effectiveness of the operation for reasons more fully described below in connection with this object of establishing biologically balanced conditions in the tank.

According to the invention this so-called oxygen profile or graph will, by the degree of the inclination or deviation of the curve or line from the horizontal indicate the extent to which the biological conditions are balanced along the net flow path of liquid from influent to effluent end of tank. Balanced conditions are associated with improved performance such as above set forth, and appear graphically when the line or curve of the oxygen level approaches the horizontal all as will be furthermore explained.

Thus, it is among the objects of this invention to so conduct and control this purification operation, that the line representing the oxygen level will show a minimum irregularity or deviation from the horizontal.

According to some aspects, this invention may be regarded as an improvement over the activated sludge treatment system described in the patent to R. H. Gould No. 2,337,384 of December 21, 1943, which aims to improve the conventional aeration system. The Gould patent recognized that in the conventionally operated aerobic treatment system an unbalance existed in the oxygen supply-oxygen demand relationship where all of the raw feed volume containing all the food for the aerobic organisms entered the treatment system at the influent end of the tank. According to the Gould improvement, lower air requirements, as well as greater load carrying ability in lbs. of B.O.D. per cu. ft. of tank volume, could be achieved when portions of feed volume were added at points spaced forwardly from one another from the inlet end of the tank.

This invention provides an improvement in various respects over the activated sludge treatment disclosed in the Gould patent which aims to improve a biologically unbalanced condition existing at the feed end of the conventionally operated tank and to some extent persisting along the entire path of the liquid to the effluent end. In the conventional tank this unbalance is due to the fact that upon initial contact at the influent end of the raw waste matter with the activated sludge, there is present a great deal more food for the aerobic organisms associated with the already formed biologic flocs, than can be assimilated by these organisms in the feed zone of the tank. This condition in turn creates a very high initial oxygen demand much greater than can be satisfied by the amount of dissolved oxygen that can be made available in the mixture. Consequently, with this initial excess of food in the presence of a relatively insufficient amount of oxygen available, the organisms cannot use their purifying potential or capacity to the fullest. Accordingly, this overload or shock-load together with the initial oxygen starvation retards the purifying effect of the organisms and thereby retards the stabilization of the organic matter or load thus applied. But as the sludge mixture advances along its net flow path horizontally, towards the end of the tank, the food supply and consequently also the oxygen demand diminish, which in turn is responsible for an unnecessarily high level of unutilized dissolved oxygen in the effluent zone of the tank. With this generally unbalanced condition, the dissolved oxygen level in the conventionally operated tank rises from zero at the inlet end to a maximum at the outlet end, which depresses the operating efficiency both as to tank volume utilization, and biological purification capacity of the treatment unit. Such a condition graphically in term of the dissolved oxygen profile presents itself as a line rising from zero value to a maximum.

According to the Gould improvement, if the raw feed is introduced in separate stages or portions at points along the longitudinal net flow path in the tank, the above unbalanced condition is partially remedied due to the effect of spreading of the raw waste load and accordingly of the oxygen demand along the tank in the direction towards the effluent end. In this way, even though the oxygen demand is thus somewhat balanced throughout the tank, there still exist marked differences in oxygen levels between different parts of the tank and particularly also between the conditions prevailing at the respective ends of the tank.

According to the invention this condition can be further significantly improved both as to tank utilization as well as biological performance. Consequently, the invention overcomes several drawbacks of the Gould method of operation. One such drawback is that the raw feed is successively added along the tank so that the time of contact of activated sludge solids or biologically active flocs with the raw sewage matter is more and more diminished inasmuch as the flow velocity is compounded with each increment of feed added to the tank. Another drawback is that the more fully developed or advanced biologic flocs which are biologically more effective in stabilizing the raw sewage matter, are found more or less only near the effluent zone and hence far remote from the influent end of the tank.

According to the invention, a factor relative to increasing both the biological and the tank efficiency lies in quickly and continuously re-distributing the more fully developed flocs from the outlet zone in the tank back through the body of sludge undergoing aeration in the tank.

To attain that condition, a manner of floc recirculation is employed by this invention internally of the tank whereby at least a portion of the more fully developed biologic flocs are continuously urged in an upstream direction and transported backwards towards the inlet end of the tank through a series of communicating treatment zones each of which in itself provides effective circulation in a body of liquid defined by the respective zone, which circulation is produced solely by means of air-diffusing air lift means in each respective zone, without the aid of mechanism.

The maximum effective contact of the sewage matter with the biologically active sludge is achieved by this internal backflow movement super-imposed relative to the net forward movement of the liquid through the tank.

In this way, the invention makes possible a more effective adsorption or attachment of finely suspended as well as dissolved polluting matter to already formed biologic flocs directly in the tank, thus utilizing the purification potential of these flocs directly and immediately, that is without requiring them to be subjected to the settling operation and to a corresponding time delay. The resulting improved adsorption effect which is followed by the oxidizing reaction, is due to the fact that the rate of attachment or adsorption increases with any increase in the ratio of the presence of the adsorbent biologic floc to the presence of the suspended substances or solids to be absorbed by the flocs. Thus, the adsorption phase is intensified throughout the length of the tank between the influent and the effluent end, so that in a given tank volume per unit of time there is produced an average improved floc quality capable of more effective net removal of polluting organic matter at relatively more efficient oxygen utilization. Cumulative advantages result from the uniform distribution of this favorable floc condition achieved by the continuous upstream transportation of the formed biologic flocs from a later treatment zone to an earlier treatment zone in the tank. Also, a greater floc density thus prevails throughout the tank.

Cumulatively, the advantages lie in an increased capacity to remove B.O.D. per unit of tank volume per unit of time, improved settleability of the final floc in a secondary clarifier, and again the improved effects upon the B.O.D. removal by such flocs supplied in the return sludge necessary to maintain effective healthy operation of the aeration tank biologically.

Further cumulative advantages are attained by this invention with respect to establishing optimum biological balance in the tank as a whole, whereby the overall efficiency is even further enhanced. This is accomplished by introducing portions of the raw feed and/or portions of the activated return sludge into respective operating zones where these stage-wise additions are thus subjected in a novel manner to the aforementioned backflow or internal recirculation effects that cause the backward transportation of biologically active flocs.

The invention as above set forth can be carried out in a variety of apparatus embodiments some of which are herein illustrated embodying apparatus features of the invention.

According to one aspect, the improved operation is carried out by establishing and maintaining, in the tank a horizontal sequence of hydraulically intercommunicating aeration treatment zones, charging air into a portion of each zone to oxygenate the same as well as to effect circulation of the liquid in said zones through at least one upflow section and at least one downflow section for upflowing and for downflowing liquid respectively, and diverting a portion of the downflowing liquid in a forward treatment zone into upflowing liquid in the rearwardly adjoining treatment zone, while displacing downflowing liquid in the last mentioned zone into upflowing liquid in a forward zone, whereby there is effected continuous backward migration of biologically active flocs towards the influent end of the tank opposed to the net forward flow movement of the liquid towards the effluent end of the tank.

According to another aspect, the improved operation is carried out by establishing in the tank a horizontal sequence of hydraulically intercommunicating downflow and upflow zones in alternation, containing downflowing and upflowing liquid respectively, charging air into the upflow zones to induce circulation between any pair of adjoining upflow and downflow zones, and diverting a portion of the downflowing liquid in a forward downflow zone into a rearwardly adjoining upflow zone, while displacing downflowing liquid in the last mentioned zone into upflowing liquid in a forward zone, whereby there is effected continuous backward migration of biologically active flocs towards the influent end of the tank opposed to the net forward flow movement of the liquid towards the effluent end of the tank.

Other features and advantages will hereinafter appear.

The novel features which are considered as characteristic of the invention are set forth in particular in the appended claims. The invention itself, however, both as to its construction and its method of operation, together with additional objects and advantages thereof will be best understood from the following description of specific embodiments when read in connection with the accompanying drawings, in which:

Different aspects of this invention lie respectively in the improved internal back flow feature with biological balance and greater floc density, and in the internal condition as compounded with the effect of activated sludge return from the clarifier. The following detailed description will deal with these aspects in that sequence.

With respect to the external recirculation of activated sludge as from the final clarifier, it is generally understood that finished flocs containing the effective biologic forms must be constantly returned to the aeration process in order to maintain a required inventory of biologically active flocs present in this system. This inventory is defined in terms of the ratio of the weight of the flocs present in the system to the weight of the incoming polluted matter. The activated sludge treatment system wherein the total circulation of the flocs must be maintained, in the present example includes the aeration tank followed by the secondary final settling tank. The inventory or weight ratio is maintainable by controlling the quantity of secondary solids that must be wasted from the system after settling and/or directly from the aeration tank. In other words, when test samples show that the floc concentration in the aeration tank diminishes, then the rate of wastage is proportionately reduced and vice versa, for the purpose of maintaining the required inventory and desired effectiveness of the purification operation.

Hence, floc detention time in the treatment system can be expressed by the total floc weight present in the system relative to the weight of new polluting matter entering the system which ratio is expressed as follows:

$$\frac{\text{lbs. of floc solids present in the treatment system}}{\text{lbs. of polluting solids entering the system per day}}$$

Normally then, for an aeration system to function properly it is necessary that the system provide an adequate floc solids detention time in the total recirculation system in order to effect completion of the oxidation reaction of the polluting solids which have been adsorbed in the manner initially herein set forth, which oxidation reaction is initiated during the contact time in the aeration tank and continues and is completed during transit in recirculation. But with this invention, the detention time is reduced.

The invention as herein exemplified may be carried out in the apparatus embodiment illustrated in FIGS. 1 to 10, whereas the graphs in FIGS. 11 to 13a illustrate the improvements in biological balance and operating efficiency relative to the conventional, as well as relative to the above mentioned Gould method which employs step-wise introduction of the feed.

Figure 1:
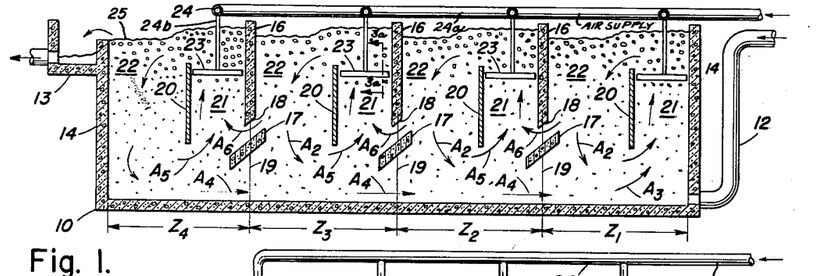
FIG. 1 is a longitudinal sectional view of one embodiment wherein the sequence of the aeration zones with their respective diffusor means, including the internal back flow feature, is so arranged that back flow occurs in the bottom zone of the tank, aided by the provision of flow diversion means.
Figure 2:
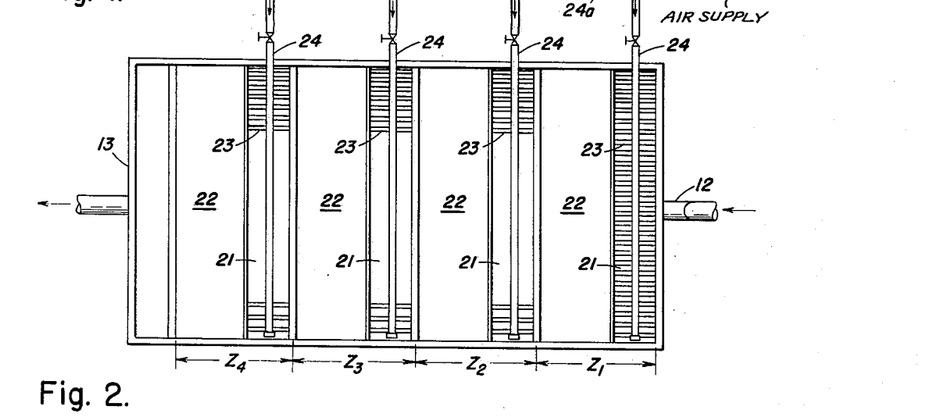
FIG. 2 is a plan view of the aeration tank of FIG. 1.

With respect to the apparatus, the FIG. 1 embodiment comprises a tank 10 having a bottom 11. Influent means 12 and effluent means 13 are provided at respective ends 14 and 15 of the tank. Between these ends, the tank is functionally sub-divided as by means of walls 16, into a horizontal sequence of any desired number of aeration zones. In the present example, these aeration zones are designated as $Z_1$, $Z_2$, $Z_3$, and $Z_4$. The transverse walls 16 emerge upwardly above the liquid level, each wall being spaced from the tank bottom to provide between it and the tank bottom flow passage space allowing for flow of liquid therethrough simultaneously both forwardly and rearwardly. This simultaneously both forwardly and rearwardly. This simultaneous countercurrent flow of liquid is more precisely defined and controlled, preferably, by the provision of a transverse diversion shelf 17 below each wall 16, which shelf is forwardly and downwardly inclined so as to provide a forward flow passage 18 above, and a rearward flow passage 19 below this shelf.

Each of the aeration zones has an intermediate transverse vertical wall 20 substantially parallel to walls 16, and defining in each said zone an upflow section 21 for the liquid to ascend therein, and a downflow section 22 for the liquid to descend therein, such circulation about the intermediate wall 20 being induced and maintained by the provision in each of the upflow sections 21 of air-diffusor means 23, preferably positioned in the upper part of the upflow section, and preferably including a horizontal system of air diffusor elements. In the present example, the diffusor elements constitute a grid-like system of parallel air-diffusor tubes which may take the form of solid tubes provided with suitably arranged air-jet openings (see detail FIG. 3a). Sub-headers 24 and branch connections 24c leading therefrom are shown to supply the required amount of air to provide the oxygen to the diffusor tubes with the sub-headers in turn applied by a main header 24a.

In the operation of this FIG. 1 embodiment, raw feed for example in the form of primary clarifier overflow supplied through the influent conduit 12 enters the first aeration zone $Z_1$ where due to the effect of the air-diffusor means 23, it is circulated through the upflow section 21 and through downflow section 22 respectively in the manner indicated by arrows $A_1$, $A_2$ and $A_3$, while the oxygen of the air enters into solution and is consumed by the aerobic organisms associated with any biological flocs present and entering into the absorption reaction with the organic waste matter supplied in the feed. Similar conditions prevail in the subsequent aeration zones $Z_2$, $Z_3$, and $Z_4$, although with the difference that the size, quality, and biologic effectiveness of the flocs improve in a forward direction from aeration zone to aeration zone with a net horizontally forward progress of the liquid through the tank and to the effluent discharge means 13.

However, according to the invention, these aeration zones co-operate with one another in such a manner that there is effected a continuous backflow or backward migration of biologically active flocs from a more developed stage to the adjoining upstream located stage. Such countercurrent or backward migration of flocs through passages 19 is indicated by the arrows $A_4$ below the respective diversion shelf 17 in the zone extending along the tank bottom between the influent and the effluent end. These bottom flows indicated by arrows $A_4$ are diverted from upflows indicated by arrows $A_5$ by the diversion shelves, while $A_6$ indicates transfer of liquid through passage 18 from the downflow section 22 of one aeration zone into the upflow section 21 of the forwardly adjoining aeration zone. The embodiment in FIG. 3 adds the feature that the rate of internal backflow of the flocs is controllable by the provision of moveable diversion shelves 26 which are adjustable so as to vary their degree of inclination, the effect of which adjustment upon the backflow rate is otherwise self-explanatory from the illustration.

Figures 4, 4A, 4B:
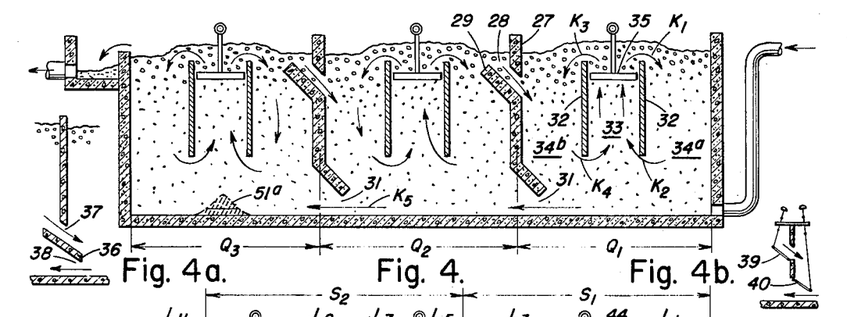
FIG. 4 shows another embodiment wherein the aeration zones and their respective diffusor means provide the back flow feature in such a manner that the net forward flow occurs in the bottom zone of the tank.
FIG. 4a is a detail illustrating a modified arrangement of the flow diversion means.
FIG. 4b is a detail illustrating another modified arrangement of the flow diversion means, featuring the adjustability of such means.

In the embodiment of FIG. 4, the main transverse partition walls 27 in the tank emerging above the liquid level and defining sequential aeration zones $Q_1$, $Q_2$, and $Q_3$, each provide a backflow passage 28 associated with a forwardly and upwardly inclined flow diversion shelf 29 which has a companion diversion shelf 30 below downwardly and rearwardly inclined from this partition wall and spaced from the tank bottom so as to constitute a bottom flow passage 39 for liquid flow in the forwardly direction. Within each of the aeration zones, $Q_1$, $Q_2$, and $Q_3$, there are provided a pair of auxiliary submerged transverse vertical partitions 32 spaced from each other as well as from their associated transverse walls of that zone. These auxiliary partitions 32 are also spaced from the tank bottom and define between them an intermediate upflow section 33 flanked by a pair of downflow sections 34a and 34b. Upflow is induced in section 33 due to the provision of air-diffusing means 35 which may be similar in construction to those illustrated in FIG. 1 above described, and preferably located in the upper part of the upflow section 33.

In this way circulation is established about both the respective auxiliary partitions 32, where arrows $K_1$ and $K_2$ indicate a backward stream or branch while arrows $K_3$ and $K_4$ indicate a forward stream or branch of this circulation.

In this embodiment it will be further noted that the flow in the bottom zone through passages 31 is in a forwardly direction as indicated by arrows $K_5$ and thus opposite to flow direction prevailing in the bottom zone of the tank in the embodiment of FIG. 1.

For use in the embodiment of FIG. 4, the detail shown in FIG. 4a illustrates a modified diversion shelf arrangement associated with the main partition wall. This modified arrangement is substantially self-explanatory, providing as it does above a diversion shelf 36 a downwardly inclined backflow passage 37, and below that shelf providing a flow passage 38 for accommodating flow in the forwardly direction at the tank bottom. The detail in FIG. 4b represents another modification of a diversion shelf arrangement suited for this invention, and featuring angularly adjustable diversion shelves 39 and 40 associated with the main partition wall, the operation and function of which shelves is self-explanatory from the illustration with respect to controlling the rate of backflow circulation.

The backflow feature of this invention is realized in the embodiment of FIG. 4 by way of inducing backward migration of the flocs directly within the respective aeration zones, and also by way of backward flow transfer of floc laden liquid from each respective aeration zone into the adjoining preceding aeration zone. Thus, in the first zone $Q_1$, the upflow stream due to the airlift effect in the intermediate section 33 splits into partial streams respectively towards and away from the influent end of the tank and across the top of respective auxiliary walls 32 and thus into respective downflow sections 34a and 34b, so that at least part of the partial forward stream $K_3$—$K_4$ after deflection by the lower diversion shelf 31 and re-entering the upflow section 33 and mixing therein with the companion stream $K_1$—$K_2$ will eventually reach the rearward downflow section 34a thereby enhancing the build-up and the effectiveness of the flocs. But, since a backward flow and migration of flocs also occurs from the next forward aeration zone $Q_2$ over diversion shelf 29 through backflow passage 28, this introduces even further developed flocs into circulation in the aeration zone $Q_1$, so that at least a portion of such flocs will reach the rearward downflow section 34a via the intermediate upflow section 33 in the manner as above set forth. Similar beneficial conditions with backflow migration are induced in all the aeration zones and between the zones incident to the net progress of the liquid horizontally through the tank, with the net result that the total biological as well as tank efficiency are improved.

Figure 5:
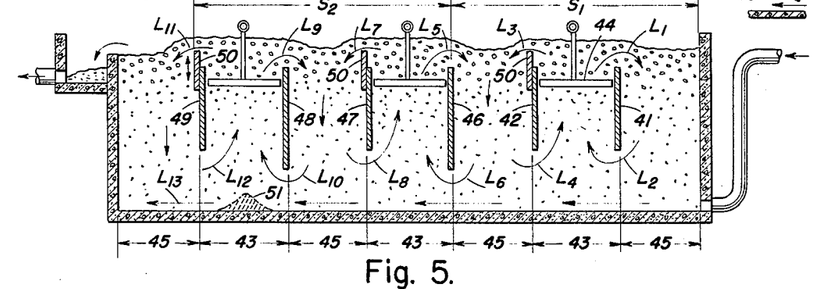
FIG. 5 shows another embodiment wherein the sequence arrangement of the aeration zones with back flow feature is such that the columns of ascending liquid alternate with columns of descending liquid, so arranged that the net forward flow occurs in the bottom zone of the tank.

The embodiment in FIG. 5 differs from the embodiment in FIG. 4 by an arrangement which avoids the provision of the main partition wall defining the aforementioned aeration zones. However, comparable beneficial effects relative to producing internal backflow with rearward migration of the flocs is nevertheless attained by way of flow-controlling and directing means associated directly with a horizontal sequence of pairs of transverse walls that constitute a sequence of upflow sections horizontally spaced from one another in the tank.

Accordingly, in this embodiment there is a first pair of transverse vertical partition walls 41 and 42 spaced from the tank bottom to constitute the first upflow section 43 provided with diffusor means 44 preferably in the upper part of that section, and which diffusor means may otherwise resemble those previously described. This upflow section 43 is spaced forwardly from the influent end of the tanks so as to constitute therewith the first downflow section 45. The next upflow section 43 similarly equipped with diffusor means is formed by transverse walls 46 and 47, with wall 46 preferably extending downwardly somewhat farther than wall 47. The last pair of walls 48 and 49 is similarly arranged constituting a similar upflow section 43 spaced from the preceding upflow section as well as from the effluent end of the tank, so that the length of the tank appears thus subdivided in such a manner as to establish a simple arrangement of upflow sections 43 alternating with downflow sections 45.

While there is noted a differential in the downward extent of walls 46 and 48 relative to respective walls 47 and 49, which differential may be adjustable to meet conditions and requirements, it is also noted that the walls 42, 47, and 49 are each provided with a transverse overflow member 50 that is vertically adjustable and arranged to discourage short-circuiting of flow from influent to effluent in the top strata of the tank, even while encouraging the internal backflow condition and rearward floc migration such as featured by this invention. Transverse stub baffles or ridges 51 may be provided on the tank bottom at the foot of respective downflow sections 45, such as indicated in dot-dash in FIG. 5, and also indicated in FIG. 4 as 51a. These ridges may be of varying height, and they may be adjustably movable parallel to themselves along the tank bottom.

In the operation of the embodiment of FIG. 5, raw feed entering the first downflow section 45 is at once drawn upwardly into the first upflow section 43 whereby raw organic sewage matter is contacted with aerobically active flocs that are present, in the presence of dissolved oxygen. The mixture emerges upwardly from the air-diffusor means 44 so that there is established a partial circulation $L_1$—$L_2$ about the wall 41, and another partial circulation $L_3$—$L_4$ about the associated wall 42, controlled by the adjustment of the overflow baffle 50 mounted on wall 42. Similar conditions of circulatory partial flows about the respective walls are induced with respect to the upflow sections, as indicated by the partial flows $L_5$—$L_6$ and $L_7$—$L_8$ for the intermediate upflow section 43, and by the partial flows $L_9$—$L_{10}$ and $L_{11}$—$L_{12}$ for the last upflow section 43 in the tank. Therefore, as flows $L_3$ and $L_5$ merge in the respective downflow section 45, and flows $L_7$ and $L_9$ merge in their respective downflow section 45, it will be seen that there is thus induced a net rearward migration of floc laden liquid by way of flows $L_{12}$, $L_8$, and $L_4$ through the respective upflow sections 43, producing beneficial effects relative to the biological and tank efficiencies comparable to those described in the foregoing embodiments of FIGS. 1 and 4. A net forward flow of liquid through the tank is indicated by flow arrows $L_{13}$ in the bottom zone of the tank between the influent and effluent thereof.

Figures 6, 7, 8:
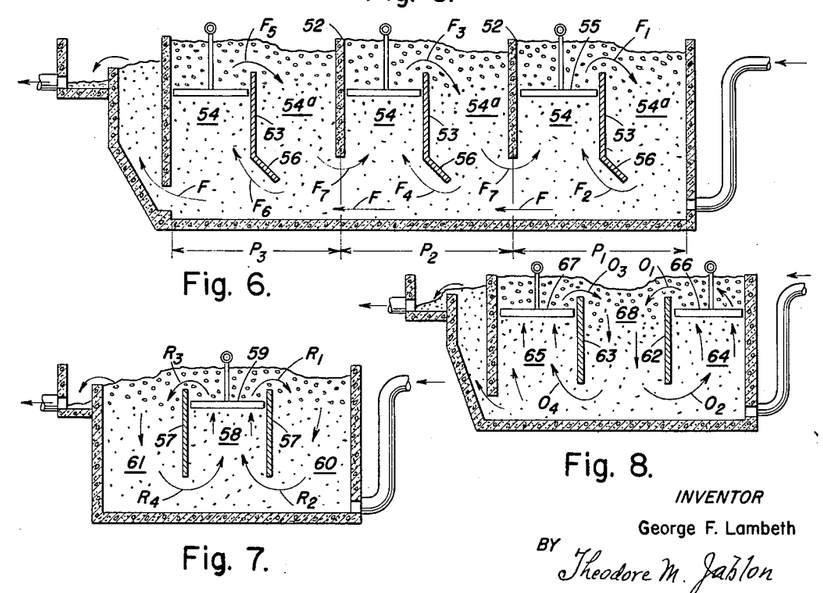
FIG. 6 is a sequence arrangement of aerating zones with back flow feature, differing from FIG. 1 in that the zones co-operate in such a manner that the net forward flow establishes itself in the bottom zone of the tank.
FIGS. 7 and 8 separately illustrate aspects of the back flow feature as embodied in the arrangement shown in FIG. 5.

The embodiment in FIG. 6 differs from that of FIG. 1 in that the upflow sections with the respective diffusor means are located on the opposite or forward side of the respective intermediate partitions in the respective aeration zones $P_1$, $P_2$, and $P_3$ and that consequently a net forward flow indicated as by arrows F occurs in the bottom zone. Hence, each of these aeration zones defined by main transverse walls 52 has an intermediate partition 53 which with the respective transverse main wall 52 constitutes an upflow section 54 provided with diffusor means 55.

With net throughflow of liquid from influent to effluent of the tank, there is established a circulatory flow $F_1$—$F_2$ about the first partition 53, with similar circulatory flows $F_3$—$F_4$ and $F_5$—$F_6$ appearing about the respective other partitions 53. Each of the partitions 53 has a its lower end a rearwardly and downwardly inclined shelf 56 to encourage backflow and rearward floc migration into the respective upflow sections 54 from respective forwardly adjoining downflow sections 54a as indicated by flow arrows $F_7$. Improvements in the biological and tank volume efficiencies are thus attained for reasons similar to those pointed out above.

The arrangement in tank of FIG. 7 is related to the embodiment of FIGS. 4 and 5 insofar as it represents to some extent the flow condition prevailing, say, in the first aeration zone $Q_1$ of FIG. 4, or else in the first section of the tank of FIG. 5 and designated therein as $S_1$. FIG. 7 a pair of submerged partitions 57 define between them an upflow section 58 equipped with diffusor means 59, and also defining with respective end walls of the tank the downflow sections 60 and 61 flanking the the intermediate upflow section 58. As indicated by the flow arrows $R_1$ and $R_2$ there is circulation about the one partition 57, while arrows $R_3$ and $R_4$ indicate circulation about the other partition 57. This arrangement causes flocs appearing from the final downflow section 61 after re-entering the upflow section 58 to migrate backwardly into the downflow section 60.

The arrangement in the tank of FIG. 8 is related to the embodiment of FIG. 5 in that it represents, to some extent, the flow conditions prevailing, say in that section of the tank of FIG. 5 designated therein as $S_2$ forwardly adjoining the aforementioned section $S_1$. In FIG. 8, a pair of submerged partitions 62 and 63 define with associated end walls of the tank a pair of upflow sections 64 and 65 equipped with diffusor means 66 and 67 respectively. Between themselves these partitions define a downflow section 68 wherein merge the flows received from the top ends of the upflow sections 64 and 65. Arrows $O_1$ and $O_2$ indicate circulation about partition 62, while arrows $O_3$ and $O_4$ indicate circulation about partition 63. Thus, at least a portion of the flocs circulating about the forward partition 63 will migrate back and into circulation about the rearward partition 62.

Figure 9:
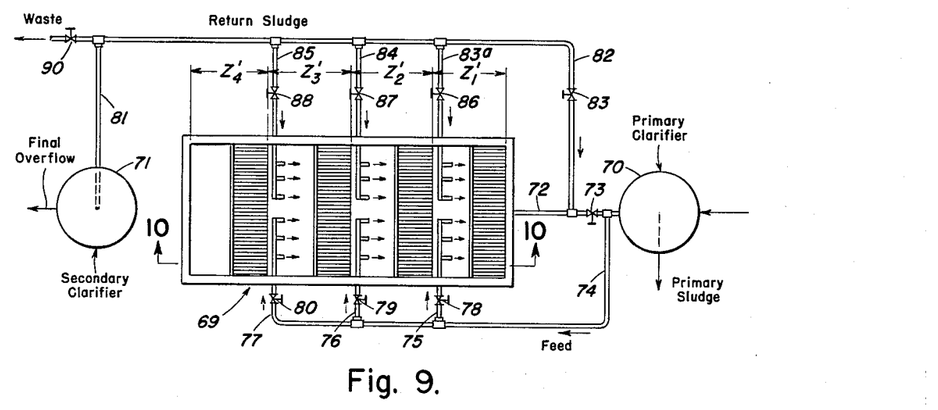
FIG. 9 is a plan view of a treatment station according to the invention with primary and secondary clarifiers, embodying additional features associated with the step-wise introduction of raw feed and/or return activated sludge.

The treatment system exemplified in FIG. 9 embodies added features whereby biological balance throughout the tank is further enhanced by a combinating of internal backflow and rearward floc migration with stepwise introduction of the raw feed and/or of return activated sludge. The example FIG. 9 therefore includes an aeration tank 69 equipped for internal backflow operation substantially according to the embodiment shown in FIG. 1 and with the respective sequence of aeration zones designated as $Z_1'$, $Z_2'$, $Z_3'$ and $Z_4'$. This aeration tank is shown co-operative with a primary clarifier 70 which may receive raw sewage, and a secondary or final clarifier 71. The overflow from the primary clarifier furnishes the raw feed for the aeration tank, whereas the secondary clarifier receives the purified floc laden liquid from the aeration tank from which purified effluent overflows while settled activated sludge is returned to the aeration tank for seeding at a rate controlled by the adjustable rate of sludge wastage from the secondary clarifier tank.

According to the invention, conduit 72 carries a first portion of the overflow from the primary clarifier as raw feed into the first aeration zone $Z_1$ of the tank at a rate controllable as by valve means 73. Branch conduit 74 carries the balance of the overflow to sub-branches 75, 76, and 77 terminating in respective aeration zones $Z_1'$, $Z_2'$, $Z_3'$ as more clearly shown in the enlarged sectional detail view of the tank in FIG. 10. This stepwise distribution of the raw feed into respective aeration zones is controllable as by valve means 78, 79, 80 respectively.

Figure 10:
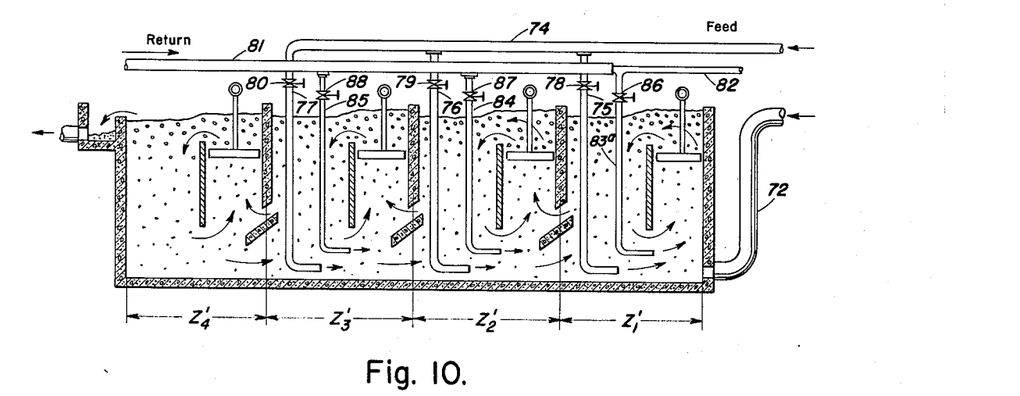
FIG. 10 is an enlarged longitudinal detail sectional view on line 10—10 of the aeration tank of FIG. 9, further illustrating the introduction of the raw feed and/or return sludge.

Activated sludge is returned from the secondary clarifier 71 back into the aeration tank by way of return conduit 81 which has one branch conduit 82 joining the raw feed conduit 72, and is provided with control valve 83. Additional branch conduits 83a, 84 and 85 terminate in respective aeration zones $Z_1'$, $Z_2'$, and $Z_3'$ for stepwise distribution thereto of activated return sludge controlled as to rate through respective valve means 86, 87, and 88 or the like. Branch conduit 89 with control valve 90 leading from the return sludge conduit 81 indicates the means for removing activated sludge from the treatment system and to waste. Both this waste and the primary sludge may be disposed of in any suitable way, for example by subjecting it to anerobic digestion.

According to additional features embodied in the treatment system of FIGS. 9 and 10, the raw feed and/or return activated sludge thus stepwise introduced are at least partially subjected to the internal backflow conditions above set forth promoting floc migration rearwardly, with the resultant advantages and improvements set forth above.

Figure 11:
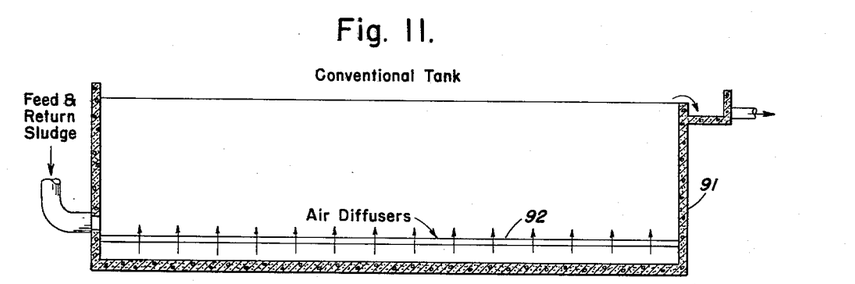
FIG. 11 illustrates a conventionally operated aeration tank.
Figure 11A:
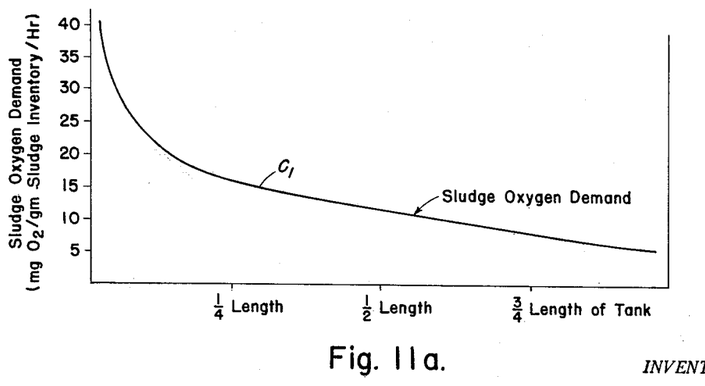
FIG. 11a graphically illustrates a corresponding conventional biological condition in terms of "Sludge Oxygen Demand"

These improvements are now furthermore explained by graphical analysis in diagram FIGURES 11 through 14b as follows:

As a comparative basis for this graphical analysis, FIG. 11 indicates a conventionally operated aeration tank 91 equipped with air diffusing means 92 effective along the length thereof. The criteria of the biological effectiveness and efficiency of the operation appear in FIG. 11a of this tank in the form of the somewhat parabolical curve C, indicating that in this instance the sludge oxygen demand is exceedingly high in the influent zone of the tank, then drops off sharply and finally more gently towards the effluent zone of the tank. The reasons for this unbalanced biological condition have been set forth above, and this condition is reflected in the curve $C_2'$ of FIG.

Figure 11B:
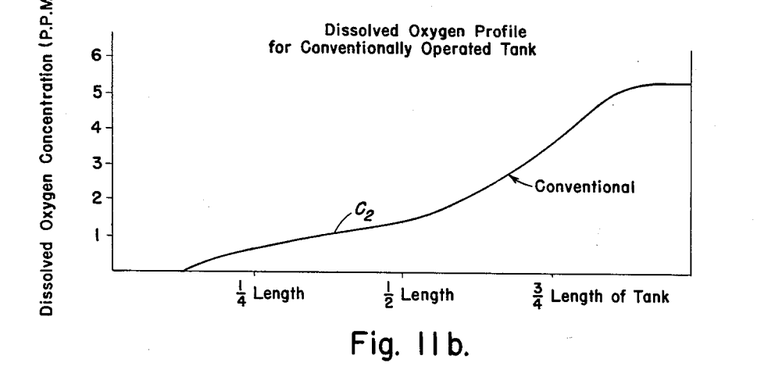
FIG. 11b graphically illustrates the conventional biological condition in terms of a "Dissolved Oxygen Profile"

11b indicating the dissolved oxygen which significantly rises from zero at the influent end to a maximum at the effluent end of the tank. This dissolved oxygen profile may serve as the main criterion for the biological performance in this aeration tank in that it shows whether or to what extent or degree the biological conditions are balanced and the oxygen is utilized in the tank.

In the further diagrams of FIGS. 12 through 14b, it will be shown that the Oxygen Profile curve resulting from this invention approaches the form of a horizontal line indicative of more uniformly balanced biological conditions in the tank.

Figure 12:
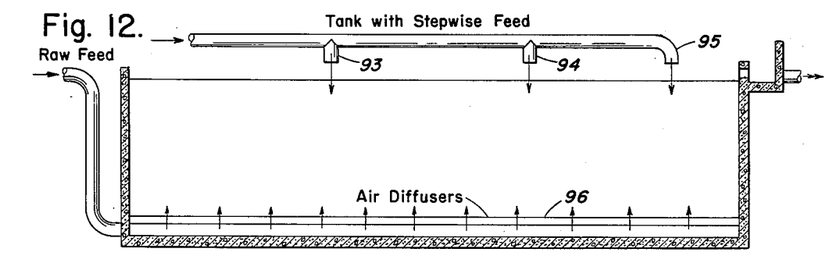
FIG. 12 illustrates a tank that adds a step-wise feed arrangement.

FIG. 12 indicates the introduction of the raw feed stepwise by spaced feed inlets 93, 94 and 95 into otherwise conventional tank having air diffusor means 96 along the length thereof. This condition is identifiable by an Oxygen Profile curve $C_3$ (see FIG. 12a). Rendered as an average profile curve $C_3'$ this presents a line that slopes from the influent zone to the effluent zone of the tank, indicating biological conditions correspondingly more balanced as compared with the conventional Oxygen Profile curve $C_2'$ also indicated in FIG. 12a for comparison.

Figure 13:
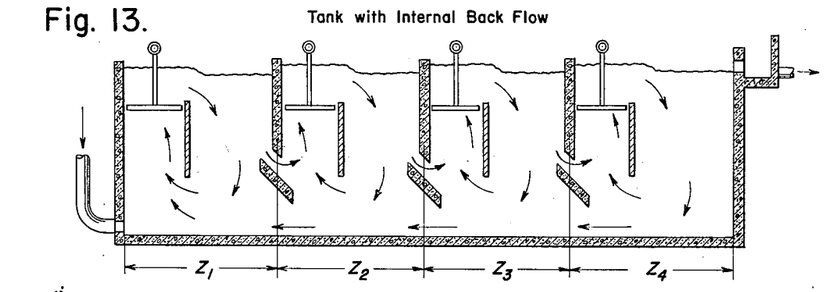
FIG. 13 represents one of the embodiments of the invention, including the internal back flow feature in a sequence of aeration zone.
Figure 13A:
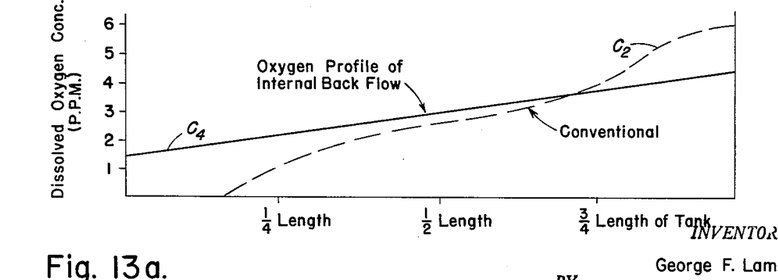
FIG. 13a illustrates a corresponding biological condition attainable with the arrangement of FIG. 13, in terms of the "Oxygen Profile" curve.

The aeration tank in FIG. 13 is equipped for inducing internal backflow and floc migration rearwardly in aeration zones $Z_1$, $Z_2$, $Z_3$, $Z_4$ resembling those shown in FIG. 1. From the graph in FIG. 13a it will be seen that this condition is associated with an Oxygen Profile $C_4$ presenting a line of relatively gentle slope rising from the influent end to the effluent end of the tank, thereby indicating biological conditions correspondingly more balanced as compared with the conventional Oxygen Profile curve $C_2$ also indicated in FIG. 13a for comparison.

Figure 12A:
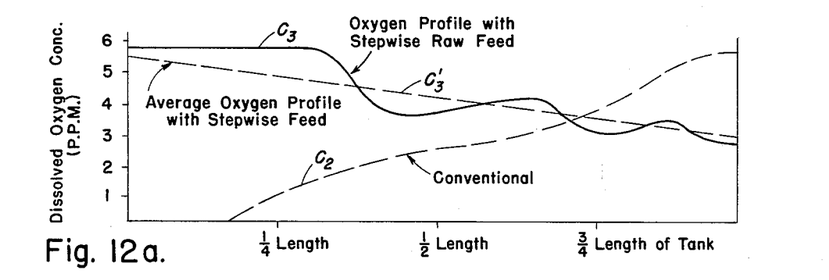
FIG. 12a illustrates a corresponding biological condition attainable with the arrangement of FIG. 12, in terms of the "Oxygen Profile" curve.
Figure 14:
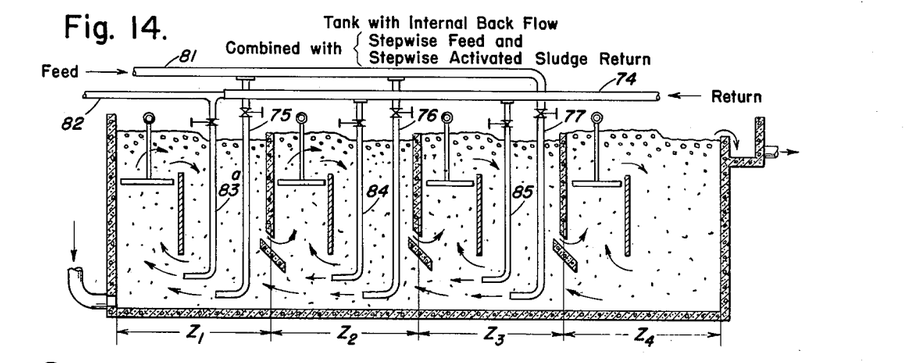
FIG. 14 adds to the back flow feature of the FIG. 13 the features of step-wise introduction of raw feed and/or activated return sludge.
Figure 14A:
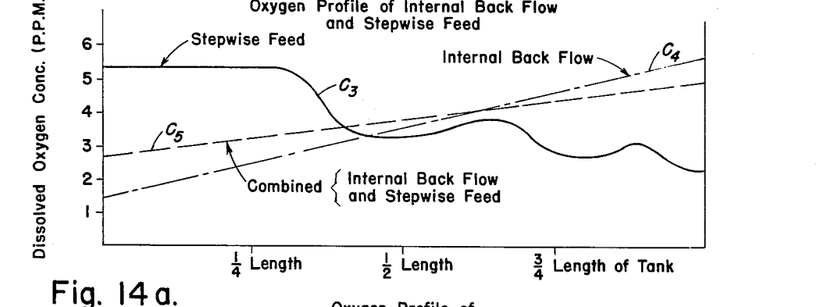
FIG. 14a illustrates the compound biological condition obtainable from the arrangement of FIG. 14 relative to step-wise introduction of raw feed.

The aeration tank exemplified in FIG. 14 is shown to be identical to the arrangement in FIG. 10, although placed with the influent at the left instead of at the right. Consequently, in FIGURES 10 and 14, corresponding numerals are applied to the various supply conduits for raw feed and for activated sludge return. The graph in FIG. 14a illustrates in terms of the dissolved oxygen profile, the compound effect attainable by the internal backflow feature combined with stepwise raw feed introduction as through supply pipes 75, 76 and 77. Hence, in FIG. 14a, the stepwise feed curve $C_3$ taken from FIG. 12a is compounded with the internal backflow curve $C_4$ from FIG. 13a, into the averaged resulting curve $C_5$. The curve $C_5$ is of a gentler slope than curve $C_4$, indicating a further improved average biological performance in the tank.

Figure 14B:
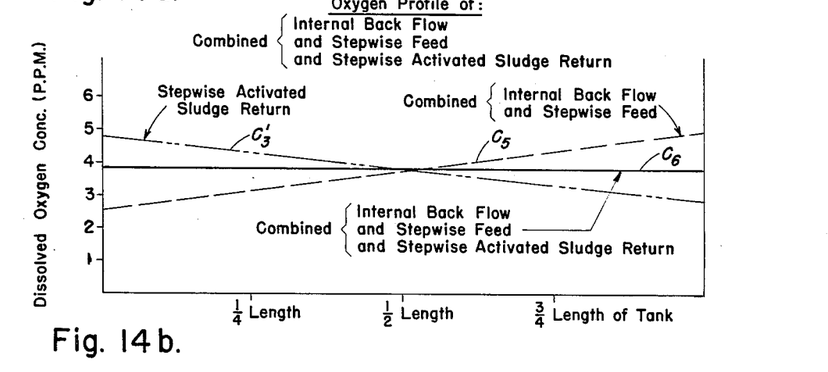
FIG. 14b illustrates the further compounded effect due to step-wise introduction of return sludge.

The graph in FIG. 14b illustrates in term of the Dissolved Oxygen Profile the further compound effect if stepwise activated sludge return as through pipes 83a, 84 and 85 is added to the stepwise raw feed introduction. In graph 14c, therefore the curve $C_3'$ taken from FIG. 12a is compounded with the resultant curve $C_5$ taken from FIG. 14a, into the final resultant curve $C_6$ shown to closely approach the horizontal, indicating further improved biological balance and performance in the tank.

From the foregoing it will be seen that the invention may be carried out by any one of the apparatus embodiments herein shown and described, with respect to inducing the combined rearward and forward flow tendencies in the aeration tank.

Figure 3:
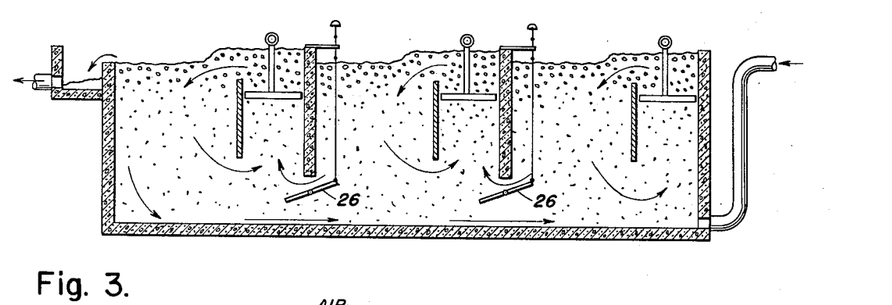
FIG. 3 shows an arrangement similar to FIG. 1, with the added feature that the flow diversion shelves are adjustable for controlling the internal back flow rate.
Figure 3A:
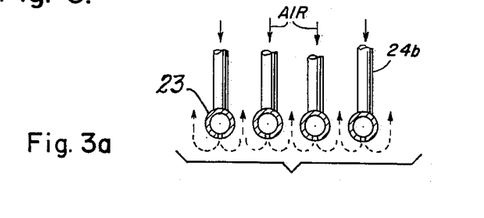
FIG. 3a is an enlarged detail section taken on line 3a—3a in FIG. 1, illustrating more clearly the arrangement of the diffusor pipes.

For example, in FIG. 1, as well as in FIG. 3 arrow $A_6$ indicates the forward flow tendency, while arrow $A_4$ indicates the rearward flow tendency between respective aeration treatment zones. In FIG. 4, the rearward flow tendency through passage 28 and also indicated by arrow $K_1$, while the forward flow tendency is indicated for example by arrow $K_5$. In FIG. 5, the rearward flow tendency is indicated for example by arrow $L_4$, and forward flow tendency represented for example by arrows $L_6$, $L_7$, and $L_{13}$. In FIG. 6 rearward tendency is indicated for example by arrows $F_3$ and $F_7$, while the forward tendency is indicated for example by arrows $F_4$ and $F$.

In FIG. 7, the rearward flow tendency is indicated by arrows $R_4$ and $R_1$, while forward flow tendency is indicated by arrows $R_2$ and $R_3$. In FIG. 8, rearward flow tendency is indicated by arrows $O_3$ and $O_2$, while forward flow tendency is indicated by arrows $O_1$ and $O_4$.

From the foregoing, it will further be seen that the induced rearward or upstream flow tendency of formed biologically active flocs makes it possible to intensify the initial absorption phase, and therefore, to reduce the aeration tank volume required for that purpose. In view of the required weight ratio or floc inventory initially herein set forth, the aeration treatment operation and aerobic purification of the liquid can be conducted much more efficiently, due to the proportionately greater concentration of the flocs per unit volume of aeration tank. Therefore, the operating requirements can be met in a smaller total treatment tank system.

Along with the advantage of improved biological performance, the invention provides savings in oxygen requirements and consequently in power for delivering the air to the diffusors.

The highly advantageous results are further compounded with those attainable from stepwise introduction into respective aeration zones of raw feed and/or return activated sludge.

It will be understood that the invention need not be limited to any particular number of treatment zones in the sequence, and that the various embodiments herein illustrated may be used in suitable combination, and further that any suitable oxygen bearing gas may be employed.

Adjustable means such as vertically adjustable gates or the like may be provided for example in the embodiments of FIGS. 1 to 4 for varying the throughflow through the passages 18 and 28 respectively. Also, the use of the transverse bottom ridges 51 and 51a exemplified in FIGS. 4 to 5 may be employed in other embodiments and arrangements possible within the scope of this invention, and the height of the ridges themselves may be variable as is indicated by the horizontal sub-division thereof in FIG. 4.

Although the horizontal diffusor pipes in the various upflow sections are herein shown located in a horizontal plane slightly below the top edge of the submerged partitions, they may be located at other levels, for example substantially in line with the top edge of these partitions.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

I claim:

1. In an activated sludge treatment tank of the throughflow type, the arrangement which comprises, a plurality of transverse main partition walls defining a horizontal sequence of hydraulically inter-communicating treatment zones, said walls being arranged to provide flow passage between the treatment zones at the bottom, a submerged transverse partition member in each said treatment zone dividing the same into an upflow section and a downflow section located forwardly from said upflow section; air diffuser means in each upflow section for oxygenating as well as impelling liquid upwardly substantally over the entire cross-section of said upflow sections to effect circulation between the upflow and the downflow section; and flow diversion shelf means in said flow passage means to provide for forward flow passage above and for rearward flow passage below said shelf means, whereby a portion of the liquid from the downflow sections is diverted rearwardly at the tank bottom, and whereby there is effected a continuous countercurrent migration of biologically active flocs towards the influent end of the tank as opposed to the net forward flow movement of the liquid towards the effluent end of the tank.

2. The arrangement according to claim 1, wherein said flow diversion means comprises at least one diversion shelf, and means for adjusting the same for varying the rate of rearwardly diverted flow.

3. The arrangement according to claim 1, wherein said flow diversion shelf means comprises at least one diversion shelf adjustable with respect to the degree of inclination.

4. In an activated sludge treatment tank of the throughflow type, the arrangement which comprises, a plurality of transverse main partition walls defining a horizontal sequence of hydraulically inter-communicating treatment zones, said walls being arranged to provide flow passage between the treatment zones at the bottom; a submerged transverse partition member in each said treatment zone dividing the same into an upflow section and a downflow section located rearwardly from said upflow section; air diffuser means in each upflow section for oxygenating as well as impelling liquid upwardly substantially over the entire cross-section of said upflow sections to effect circulation between the upflow and the downflow section; and a flow diversion shelf at the lower end of said auxiliary partition member, which shelf is rearwardly and downwardly inclined extending downwardly to a point below the bottom edge of the main partition walls, whereby a portion of the liquid from downflow sections is diverted rearwardly while displacing liquid from each downflow section along the tank bottom towards the effluent end of the tank, and whereby there is effected a continuous countercurrent migration of biologically active flocs towards the influent end of the tank as opposed to the net forward flow movement of the liquid towards the effluent end of the tank.

5. In an activated sludge treatment tank of the throughflow type, the arrangement which comprises, a plurality of transverse main partition walls defining a horizontal sequence of hydraulically inter-communicating treatment zones, said walls being arranged with passage means to provide flow passages both forwardly and rearwardly; a pair of submerged transverse partition members spaced from the tank bottom in each said treatment zone dividing the same into an intermediate upflow section between said partition members, and a pair of downflow sections located respectively rearwardly and forwardly of said intermediate upflow section; air diffuser means in each upflow section for oxygenating as well as impelling liquid upwardly substantially over the entire cross-section of said upflow sections to effect circulation about the respective partition members; and flow diversion means associated with respective walls and flow passage means for effecting flow diversion from the upflowing liquid in a forward treatment zone into downflowing liquid in the rearwardly adjoining treatment zone, while displacing liquid from the last mentioned treatment zone into a forwardly located treatment zone, whereby a portion of the liquid from the forwardly located downflow sections is diverted rearwardly while displacing liquid from each downflow section at the tank bottom towards the effluent end of the tank, and whereby there is effected a continuous countercurrent migration of biologically active flocs towards the influent end of the tank as opposed to the net forward flow movement of the liquid towards the effluent end of the tank.

6. The arrangement according to claim 5, wherein said flow diversion means comprise a forwardly inclined flow diversion shelf at the upper end of said wall, inclined so as to provide for rearward flow passage above said shelf, and a rearwardly inclined flow diversion shelf at the lower end of said wall, inclined so as to provide for a forward flow passage below said shelf.

7. In an activated sludge treatment tank of the throughflow type, the arrangement which comprises, a first sequence of transverse submerged partition members spaced from one another, a second sequence of transverse partition members each of which is associated with and located forwardly of a respective partition member of the first sequence, and having a top overflow edge higher than the submerged partition, and constituting with the associated submerged partition an upflow section while constituting with the next forwardly located submerged partition a downflow section, so that the tank is subdivided into alternating downflow and upflow sections, and air diffuser means in each upflow section for oxygenating as well as impelling liquid upwardly substantially over the entire cross-section of said upflow sections to effect circulation forwardly and backwardly about the respective partition members, whereby a portion of the liquid from respective downflow sections is diverted rearwardly into respective adjoining upflow sections while displacing liquid from each downflow section at the tank bottom towards the effluent end of the tank, and whereby there is effected a continuous countercurrent migration of biologically active flocs towards the influent end of the tank as opposed ot the net forward flow movement of the liquid towards the effluent end of the tank.

8. The arrangement according to claim 7, wherein the height of said overflow edge is adjustable relative to liquid level in the tank.

9. The arrangement according to claim 7, with the addition of at least one transverse ridge on the tank bottom, located at the foot end of an upflow section.

10. The arrangement according to claim 7, with the addition of at least one transverse ridge member on the tank bottom, said ridge member being adjustably movable along the tank bottom.

11. In an activated sludge treatment tank of the throughflow type, the arrangement which comprises, submerged parallel transverse partitions arranged to provide in said tank a first plurality of upflow sections and to provide a second plurality of downflow sections alternating with the upflow sections, said downflow sections hydraulically inter-communicating at the top and at the bottom with each other and with the upflow sections, said first plurality of sections being so arranged relative to said second plurality of sections that each upflow section delivers liquid into a forward as well as into a rearward adjoining downflow section, wherein the partition constituting the rearward wall of at least one upflow section is spaced closer to the tank bottom than the partition forming the forward wall portion of said upflow section; and air diffusor means for each upflow section for oxygenating the liquid as well as for impelling the same upwardly substantially over the entire cross-section thereof, whereby a portion of the liquid from respective downflow sections is diverted rearwardly into respective adjoining upflow sections while displacing liquid from each downflow section at the tank bottom towards the effluent end of the tank, and whereby there is effected a continuous countercurrent migration of biologically active flocs towards the influent end of the tank as opposed to the net forward flow movement of the liquid towards the effluent of the tank.

12. In an activated sludge treatment tank of the horizontal throughflow type having a feed influent end and an overflow effluent end, the arrangement which comprises a plurality of transverse main partition walls defining a horizontal sequence of hydraulically intercommunicating treatment zones, said partition walls being arranged to provide flow passage between said treatment zones at the bottom; a submerged transverse partition member in each said treatment zone dividing the same into an upflow section adjacent to the respective main partition walls and a downflow section located rearwardly from the upflow section, air diffuser means located in each upflow section for oxygenating as well as impelling liquid upwardly substantially over the entire cross-sectional area of said upflow section to effect circulation between the upflow and the downflow section; and flow diversion shelf means located in said flow passage means to provide for forward flow passage below and for rearward flow passage above said shelf means, whereby a portion of the liquid from the downflow sections is displaced rearwardly at the tank bottom and whereby there is effected a continuous countercurrent migration of biologically active flocs within the tank towards the influent end of the tank as opposed to the net forward flow movement of the liquid towards the effluent end of the tank.

13. Apparatus for the continuous treatment of waste liquids whereby the waste matter in the liquid is converted into biologically active flocs in the presence of dissolved oxygen, which comprises a tank for holding a liquid body with the liquid level opened to the atmosphere, having a substantially horizontal bottom and side walls, a feed inlet end in one side wall for feeding the waste liquid into the tank, and an effluent end in the opposite side wall for discharging treated liquid with the flow direction of the liquid being from the inlet towards the outlet, a plurality of substantially vertical partition walls spaced horizontally from one another and extending transversely of the flow direction and establishing in the tank a horizontal series of vertical flow sections, each of said vertical flow sections being only either an upflow or a downflow section, said upflow and downflow sections being arranged in alternation and having flow communication with one another whereby the liquid is adapted to pass freely in its generally forward course from the influent end to the effluent end of the tank, submerged air diffuser means located in each upflow section between the upper and lower ends of the partition walls for oxygenating the liquid and forming the waste matter therein into biologically active flocs while impelling the liquid upwardly within the entire flow area of the upflow sections, and cooperatively so arranged with respect to the partition walls and said flow communication that one portion of the liquid from respective vertical upflow sections will pass freely into a forwardly located vertical section while another portion will pass freely through a rearwardly located vertical section, causing continuous free rearward migration of biologically active flocs countercurrent to the free net forward movement of the liquid in the tank, said migration effecting contact of flocs from a downstream treatment phase with waste matter of an upstream treatment phase in the tank, while the resultant flocs discharge freely with the treated liquid from the last treatment section.

14. The apparatus according to claim 13, wherein said air diffuser means comprise a plurality of horizontally extending longitudinal diffuser elements horizontally laterally spaced form one another.

15. The apparatus according to claim 13, with the addition of supply conduit means for introducing feed liquid stepwise into respective different vertical flow sections.

16. The apparatus according to claim 13, with flow controlling means cooperatively associated with the respective vertical upflow sections and arranged for increasing the rate of rearward flow of said last mentioned liquid portion relative to the rate of forward flow of said first mentioned liquid portion.

17. The apparatus according to claim 13, with the addition of supply conduit means for introducing return activated sludge derived from secondary clarification into respective different flow sections.

18. Apparatus for the continuous treatment of waste liquids whereby the waste matter in the liquid is converted into biologically active flocs in the presence of dissolved oxygen, which comprises a tank for holding a liquid body with the liquid level open to the atmosphere having a substantially horizontal bottom and side walls, a feed influent end in one side wall for feeding the waste liquid into the tank, and an effluent end in the opposite side wall for discharging treated liquid with the flow direction of the liquid being from inlet toward the outlet, at least a pair of substantially vertical partition walls spaced horizontally from each other and extending transversely of the flow direction and arranged to provide free flow communication across the top and across the bottom of said partition walls, said partition walls dividing the tank into an intermediate vertical upflow only section and a pair of vertical downflow only sections located respectively rearwardly and forwardly of said intermediate upflow section, submerged air diffuser means located in said upflow section between the upper and the lower end of said partition walls, for oxygenating the liquid and forming the waste matter therein into biologically active flocs while impelling the liquid upwardly within the entire flow area of the upflow section, whereby when liquid undergoing treatment passes through the tank one portion of the liquid from the upflow section will pass freely into the forward section while another portion will pass freely into the rearward section, and whereby there is maintainable a continuous free rearward migration of biologically active flocs countercurrent to the free net forward flow movement of the liquid through the tank, said migration effecting contact of flocs from a downstream treatment phase with waste matter of an upstream treatment phase in the tank, while the resultant flocs discharge freely with the treated liquid from the last treatment section.

19. Apparatus for the continuous treatment of waste liquids whereby the waste matter in the liquid is converted into biologically active flocs in the presence of dissolved oxygen, which comprises a tank for holding a liquid body with the liquid level open to the atmosphere, having a substantially horizontal bottom and side walls, a feed influent end in one side wall for feeding the waste liquid into the tank, and an effluent end in the opposite side wall for discharging treated liquid with the flow direction of the liquid being from the inlet toward the outlet, at least a pair of substantially vertical partition walls spaced horizontally from each other and extending transversely of the flow direction and arranged to provide free flow communication across the top and across the bottom of said partition walls, said partition walls dividing the tank into an intermediate vertical downflow only section and a pair of vertical upflow only sections located respectively rearwardly and forwardly of said intermediate downflow section, submerged air diffuser means located at each of said upflow sections between the upper and the lower end of said partition walls for oxygenating the liquid and forming the waste matter therein into biologically active flocs while impelling the liquid upwardly within the entire flow area of the respective upflow sections, whereby when liquid undergoing treatment passes through the tank one portion of the liquid from the intermediate downflow section will pass freely into the forward upflow section while another portion will pass freely into the rearward upflow section, and whereby there is maintained a continuous free rearward migration of biologically active flocs countercurrent to the free net forward flow movement of the liquid through the tank, said migration effecting contact of the flocs from a downstream treatment phase with waste matter of an upstream treatment phase in the tank, while the resultant flocs discharge freely with the treated liquid from the last treatment section.

20. The method of continuous treatment of waste liquids passing through a treatment zone with the liquid level open to the atmosphere, whereby the waste matter in the liquid is converted into biologically active flocs in the presence of dissolved oxygen and the treated liquid carrying the flocs discharges from said treatment zone, which comprises establishing and maintaining a horizontally extending flowing body of said liquid, dividing the treatment zone into a plurality of zones by means of a plurality of substantially vertical partition walls spaced horizontally from one another and extending transversely to the flowing body, said zones being alternately upflow and downflow zones with the respective zones being only either an upflow or a downflow zone, said zones having free flow communication with each other at the top and bottom of each zone, feeding waste liquid to the first of said zones while discharging treated liquid from the last of said zones, charging treatment air into each of said upflow zones from a region located between the upper and lower ends thereof for oxygenating as well as upwardly impelling said liquid only through said upflow zones within the entire flow area thereof, and controlling the flow of the liquid through said series of vertical zones and said flow communications so that one portion of the liquid from respective vertical zones will pass freely into a forwardly located zone while another portion of said liquid will pass freely through a rearwardly located zone, thereby inducing a rearward free migration of biologically active flocs countercurrent to the free net forward flow movement of the liquid, said migration effecting contact of flocs from a later treatment phase with waste matter of an earlier treatment phase.

21. The method according to claim 20, which comprises also introducing waste liquid feed stepwise into respective different vertical zones of said series.

22. The method according to claim 20, which comprises also introducing waste liquid feed stepwise into respective different vertical zones of said series, and similarly stepwise introducing return sludge derived from a secondary clarification.

23. The method according to claim 20, which comprises also introducing return sludge derived from a secondary clarification stepwise into respective different vertical zones of said series.

References Cited in the file of this patent

UNITED STATES PATENTS

| | | |
|---|---|---|
| 1,139,024 | Frank | May 11, 1915 |
| 1,341,561 | Jones | May 25, 1920 |
| 2,081,851 | Darby et al. | May 25, 1937 |
| 2,081,852 | Darby et al. | May 25, 1937 |
| 2,188,162 | Schulhoff | Jan. 23, 1940 |
| 2,272,441 | Streander | Feb. 10, 1942 |
| 2,436,584 | Logan | Feb. 23, 1948 |
| 2,574,685 | Baxter et al. | Nov. 13, 1951 |
| 2,708,571 | Fischerstrom et al. | May 17, 1955 |
| 2,719,032 | Schnur | Sept. 27, 1955 |

FOREIGN PATENTS

| | | |
|---|---|---|
| 23,146 | Great Britain | May 17, 1914 |
| 24,974 | Denmark | Aug. 27, 1919 |